United States Patent
Lighty et al.

(10) Patent No.: US 11,022,174 B2
(45) Date of Patent: Jun. 1, 2021

(54) DRAIN ARRANGEMENT FOR A SQUEEZE FILM DAMPER

(71) Applicant: Rolls-Royce Corporation, Indianapolis, IN (US)

(72) Inventors: Kerry Lighty, Plainfield, IN (US); David Farnum, Indianapolis, IN (US); Daniel Feinstein, Zionsville, IN (US); Joseph Swift, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 349 days.

(21) Appl. No.: 16/146,719

(22) Filed: Sep. 28, 2018

(65) Prior Publication Data
US 2020/0102986 A1 Apr. 2, 2020

(51) Int. Cl.
*F01D 25/16* (2006.01)
*F16C 27/04* (2006.01)
(Continued)

(52) U.S. Cl.
CPC ........ *F16C 33/6685* (2013.01); *F01D 25/164* (2013.01); *F01D 25/18* (2013.01);
(Continued)

(58) Field of Classification Search
CPC .. F16C 27/045; F16C 33/6685; F01D 25/164; F16F 15/0237; F16N 31/00
(Continued)

(56) References Cited

U.S. PATENT DOCUMENTS

| 3,589,471 A | 6/1971 | Edge |
| 3,915,521 A | 10/1975 | Young |

(Continued)

FOREIGN PATENT DOCUMENTS

| DE | 952756 C | 11/1956 |
| EP | 2657463 A1 | 10/2013 |

(Continued)

OTHER PUBLICATIONS

Extended European Search Report from counterpart EP Application No. 19193754.9 dated Feb. 10, 2020, 24 pgs.
(Continued)

*Primary Examiner* — Michael R Mansen
*Assistant Examiner* — Mark K Buse
(74) *Attorney, Agent, or Firm* — Shumaker & Sieffert, P.A.

(57) ABSTRACT

An oil scavenge system of a rotatable machine having an axis of rotation is disclosed. The oil scavenge system comprises a sump housing, a scavenge conduit, a bearing, and a squeeze film damper. The sump housing is arranged about the axis and at least partly defining a sump. The sump housing has a radially inner surface for directing the flow of oil and defining a collection orifice. The scavenge conduit is in fluid communication with the collection orifice and a downstream location remote from the sump. The bearing is disposed within the sump. The squeeze film damper is positioned proximate the bearing. The squeeze film damper comprises an annular channel and a supply line. The supply line supplies oil to the annular channel. The squeeze film damper further comprises a discharge line. The discharge line is axially aligned with and discharges toward an inner wall of the scavenge conduit.

15 Claims, 7 Drawing Sheets

(51) Int. Cl.
*F16F 15/023* (2006.01)
*F16C 33/66* (2006.01)
*F01D 25/18* (2006.01)
*F16N 31/00* (2006.01)

(52) U.S. Cl.
CPC ........ *F16C 27/045* (2013.01); *F16C 33/6677* (2013.01); *F16F 15/0237* (2013.01); *F16N 31/00* (2013.01); *F05D 2240/54* (2013.01); *F16C 2360/23* (2013.01)

(58) Field of Classification Search
USPC ...................................................... 184/6.11
See application file for complete search history.

(56) References Cited

U.S. PATENT DOCUMENTS

| | | | |
|---|---|---|---|
| 4,329,000 A | 5/1982 | Keske | |
| 4,334,720 A | 6/1982 | Signer | |
| 4,384,749 A | 5/1983 | Schaefer | |
| 4,392,751 A * | 7/1983 | Ida ........................ | F16C 32/067 384/114 |
| 4,541,738 A | 9/1985 | Leibensperger et al. | |
| 4,775,248 A | 10/1988 | Barbic et al. | |
| 4,782,919 A * | 11/1988 | Chalaire ............. | F16F 15/0237 184/6.11 |
| 4,947,639 A | 8/1990 | Hibner et al. | |
| 4,952,076 A * | 8/1990 | Wiley, III ............. | F01D 25/164 384/535 |
| 4,981,415 A | 1/1991 | Marmol et al. | |
| 4,983,051 A * | 1/1991 | Hibner .................. | F01D 25/164 384/99 |
| 5,106,209 A | 4/1992 | Atkinson et al. | |
| 5,110,257 A | 5/1992 | Hibner et al. | |
| 5,149,206 A * | 9/1992 | Bobo .................... | F01D 25/164 248/562 |
| 5,183,342 A | 2/1993 | Daiber et al. | |
| 5,215,384 A * | 6/1993 | Maier .................... | F16C 17/03 384/117 |
| 5,253,985 A * | 10/1993 | Ruetz .................... | F01D 25/164 384/473 |
| 6,250,897 B1 * | 6/2001 | Thompson ............ | F04D 29/059 417/407 |
| 6,257,368 B1 * | 7/2001 | Young .................... | F16C 33/10 184/6.12 |
| 6,682,222 B2 | 1/2004 | Fisher | |
| 6,976,827 B2 | 12/2005 | Bruno et al. | |
| 7,018,104 B2 * | 3/2006 | Dourlens ................ | F16F 15/06 384/309 |
| 7,329,048 B2 * | 2/2008 | Klusman ............... | F16C 35/077 384/99 |
| 7,500,311 B2 | 3/2009 | Shimomura | |
| 7,665,897 B2 * | 2/2010 | Alam .................... | F01D 25/164 384/99 |
| 7,931,407 B2 | 4/2011 | Begin et al. | |
| 8,464,835 B2 | 6/2013 | Munson | |
| 8,834,095 B2 | 9/2014 | Davis | |
| 8,894,286 B2 * | 11/2014 | Nicholas ................ | F16C 17/03 384/302 |
| 8,985,277 B2 | 3/2015 | Hetherington et al. | |
| 9,541,007 B2 | 1/2017 | McCune et al. | |
| 9,752,616 B2 * | 9/2017 | Saadi .................... | F16C 33/106 |
| 9,841,056 B2 | 12/2017 | Snow et al. | |
| 10,502,096 B2 * | 12/2019 | Orkiszewski ......... | F16C 27/045 |
| 10,527,098 B1 | 1/2020 | Lighty et al. | |
| 2003/0039421 A1 | 2/2003 | Fisher et al. | |
| 2004/0022463 A1 * | 2/2004 | Dusserre-Telmon ........ | F16C 33/6659 384/99 |
| 2006/0193545 A1 | 8/2006 | Bridges et al. | |
| 2007/0165971 A1 | 7/2007 | Alam et al. | |
| 2013/0149141 A1 | 6/2013 | Siniawski | |
| 2013/0283758 A1 | 10/2013 | Wotzak | |
| 2014/0185974 A1 * | 7/2014 | Schmidt ................ | F16C 19/18 384/474 |
| 2015/0219152 A1 | 8/2015 | Ward | |
| 2017/0234222 A1 | 8/2017 | Schwendenmann | |
| 2017/0292405 A1 * | 10/2017 | Isogai ................... | F16C 35/077 |
| 2018/0087404 A1 | 3/2018 | Lighty | |
| 2020/0102854 A1 | 4/2020 | Lighty et al. | |
| 2020/0102985 A1 | 4/2020 | Lighty et al. | |

FOREIGN PATENT DOCUMENTS

| | | |
|---|---|---|
| EP | 3284918 A1 | 2/2018 |
| EP | 3299585 A1 | 3/2018 |
| GB | 2218751 A | 11/1989 |
| GB | 2218751 B | 5/1992 |
| JP | 2003139134 | 5/2003 |

OTHER PUBLICATIONS

Response to Extended Search Report dated Feb. 2, 2020, from counterpart European Application No. 19193754.9, filed Sep. 23, 2020, 46 pages.

Communication pursuant to Article 94(3) EPC from counterpart EP Application No. 19193754.9 dated Apr. 9, 2021, 8 pgs.

* cited by examiner

DRAIN ARRANGEMENT FOR A SQUEEZE FILM DAMPER

CROSS-REFERENCE TO RELATED APPLICATIONS

This application is related to concurrently filed U.S. patent application Ser. No. 16/146,494, entitled "SYSTEMS AND METHODS OF OIL DISTRIBUTION FOR A BEARING,", filed Sep. 28, 2018, inventors: Kerry Lighty, Andrew Schwendenmann and Eric McClellan; U.S. patent application Ser. No. 16/146,563, entitled "SPLINED OIL CATCHER,", filed Sep. 28, 2018, inventors: Kerry Lighty and Brian Fish; and U.S. patent application Ser. No. 16/146,660, entitled "OIL JET IN A CONFINED AXIAL SPACE,", filed Sep. 28, 2018, inventors: Kerry Lighty and David Farnum. The entirety of these applications are herein incorporated by reference.

BACKGROUND

Squeeze film dampers are used with bearings in rotating machines in order to address concerns about rotor dynamics such as excess vibrations. Generally, squeeze film dampers comprise a thin film of oil, which may be sealed between a pair of annular members, such that movement of an associated bearing is dampened.

FIG. 1 is a cross-sectional view of a typical squeeze film damper 10. The squeeze film damper 10 comprises an annular channel 12 positioned radially outward of a bearing 14. The annular channel 12 receives a supply of pressurized oil from a lubrication supply 48 via a supply line 50 and discharges oil via a discharge line 16. The supply line 50 may be coupled to the annular channel 12 at a top dead center position. The annular channel 12 filled with pressurized oil serves to dampen motion of the bearing 14, primarily in a radial direction. Oil discharged from the annular channel 12 via the discharge line 16 is directed to a sump 18, which is an annular space driven by windage from the rotating shafts. The discharge line 16 may discharge oil at a bottom dead center position. The discharged oil is collected in the sump 18 via a collection orifice 20 and recirculated to a lubrication and scavenge system via a scavenge conduit 30.

SUMMARY

According to some aspects of the present disclosure, an oil scavenge system of a rotatable machine having an axis of rotation is disclosed. The oil scavenge system comprises a sump housing, a scavenge conduit, a bearing, and a squeeze film damper. The sump housing is arranged about the axis and at least partly defining a sump. The sump housing has a radially inner surface for directing the flow of oil and defining a collection orifice. The scavenge conduit is in fluid communication with the collection orifice and a downstream location remote from the sump. The bearing is disposed within the sump. The squeeze film damper is positioned proximate the bearing. The squeeze film damper comprises an annular channel and a supply line. The supply line is for supplying oil to the annular channel. The squeeze film damper further comprises a discharge line. The discharge line is axially aligned with and discharges toward an inner wall of the scavenge conduit.

In some embodiments, the discharge line is fluidly coupled to the scavenge conduit at a position downstream from the collection orifice. In some embodiments, the discharge line passes through one or more bearing mount rings. In some embodiments, the discharge line passes through one or more bearing pedestals. In some embodiments, the discharge line is coupled to the scavenge conduit between the collection orifice and a scavenge pump.

In some embodiments, the discharge line is aimed to direct oil directly into the collection orifice. In some embodiments, the collection orifice is positioned radially outward from and axially aligned with the discharge line. In some embodiments, the discharge line discharges oil at a sufficient pressure to direct the oil directly into the collection orifice. In some embodiments, the collection orifice is circumferentially offset from the discharge line.

In some embodiments, the oil scavenge system further comprises a support arm radially outward from and supporting said bearing. In some embodiments, the discharge line passes through the support arm, and the discharge line is sized and positioned to direct oil into the collection orifice. In some embodiments, the support arm is radially spaced from the collection orifice.

In some embodiments, the collection orifice is positioned at a radial extremity of the radially inner surface of the sump housing. In some embodiments, the oil scavenge system further comprises one or more seals axially defining the annular channel.

According to some aspects of the present disclosure, an oil scavenge system of a rotatable machine having an axis of rotation is disclosed. The oil scavenge system comprises a sump housing, a scavenge conduit, a bearing, and a squeeze film damper. The sump housing is arranged about the axis and at least partly defining a sump. The sump housing has a radially inner surface for directing the flow of oil and defining a collection orifice. The scavenge conduit is in fluid communication with the collection orifice and a downstream location remote from the sump. The bearing is disposed within the sump. The squeeze film damper is positioned proximate the bearing. The squeeze film damper comprises an annular channel and a supply line. The supply line is for supplying oil to the annular channel. The squeeze film damper further comprises a discharge line in fluid connection with the annular channel. The discharge line discharges oil directly into the scavenge conduit without the oil contacting the radially inner surface.

In some embodiments, the discharge line is fluidly coupled to the scavenge conduit at a position downstream from the collection orifice. In some embodiments, the discharge line is aimed to direct oil directly into the collection orifice.

According to some aspects of the present disclosure, a method of operating an oil scavenge system of a rotatable machine having an axis of rotation is disclosed. The method comprises supplying oil to a bearing, supplying oil to a squeeze film damper, collecting oil from the bearing, draining oil from the sump, and discharging oil from the annular channel of the squeeze film damper. The bearing is disposed within a sump at least partly defined by a sump housing arranged about the axis of rotation. The sump housing has a radially inner surface for directing the flow of oil. The squeeze film damper is positioned proximate the bearing and comprises an annular channel and a supply line for supplying oil to the annular channel. Oil is collected from the bearing at a collection orifice defined by the radially inner surface. Oil is drained from the sump to a scavenge conduit coupled to the sump housing at the collection orifice to direct the flow of oil away from the sump. Oil is discharged from the annular channel directly into the scavenge conduit via a discharge line without contacting the radially inner surface.

In some embodiments, the method further comprises discharging oil from the annular channel via the discharge line. The discharge line is fluidly coupled to the scavenge conduit at a position downstream from the collection orifice. In some embodiments, the method further comprises discharging oil from the annular channel at a sufficient pressure to direct the oil directly into the collection orifice.

BRIEF DESCRIPTION OF THE DRAWINGS

The following will be apparent from elements of the figures, which are provided for illustrative purposes.

Figure 1:
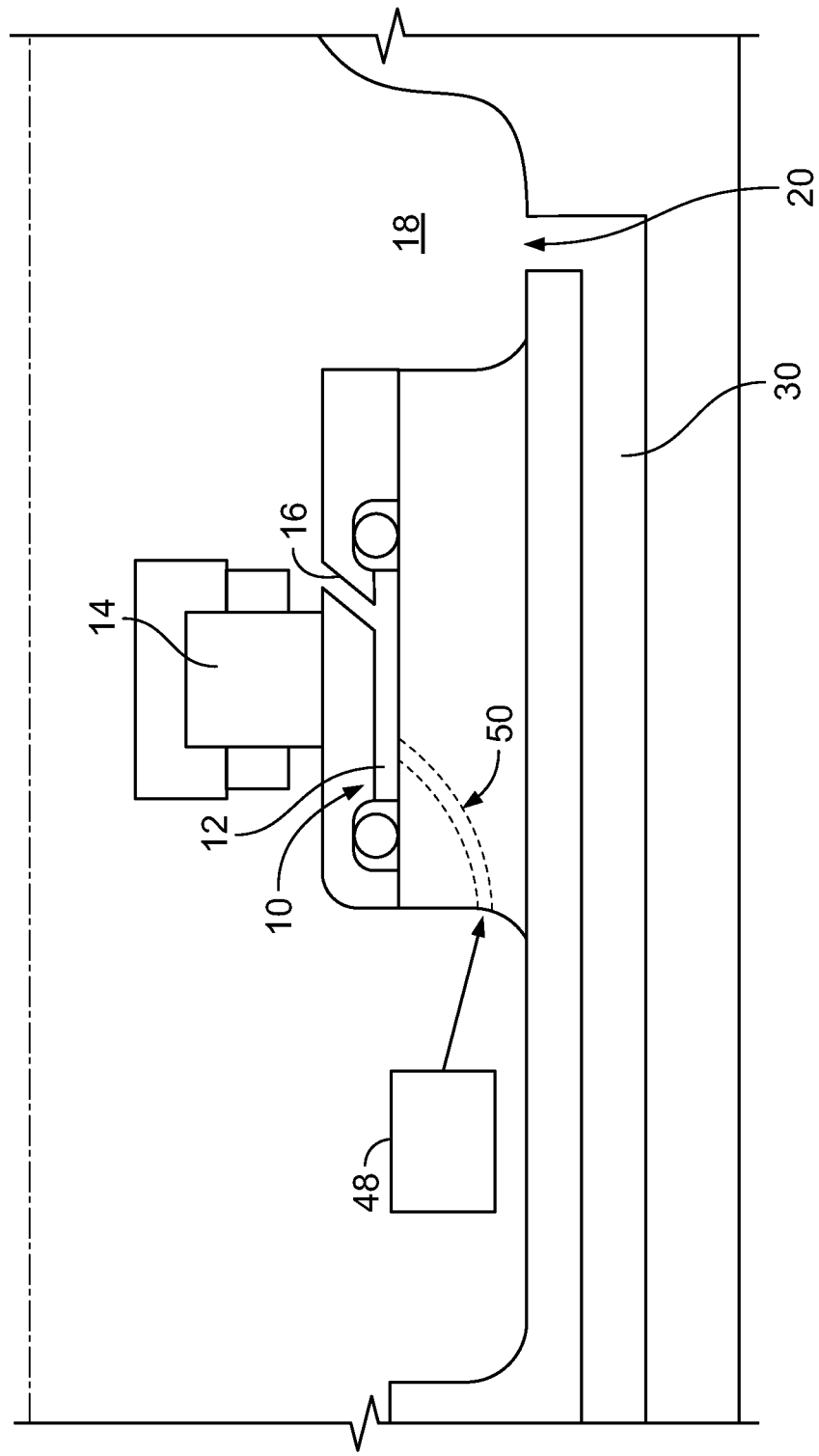
FIG. 1 is a cross-sectional view of a bearing region in a prior art rotating machine taken along the axis of rotation of the region.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Squeeze film dampers generally have pressurized oil supplied to an annular groove which includes a drain that allows the pressurized oil to exit the annular groove and flow into the sump. A bearing proximate the squeeze film damper requires a separate oil supply in order to lubricate the bearing and remove the heat generated during operation. The oil supplied to the bearing flows from the bearing into the sump. The sump is therefore required to be large enough to adequately contain both the damper oil and bearing oil as it accumulates at a collection point in the sump in order to be scavenged and removed. The collected oil then drains from the sump into a scavenge line and may be recirculated into the lubrication and scavenge system.

As the bearings and the squeeze film dampers both require a supply of oil and thereby create a large flowrate of oil for the sump to scavenge, oil management inside the sump is a primary concern during sump design. For rotating machines in which space is at a premium—for example in gas turbine engines for aviation applications—it can be desirable to minimize the size of the sump. However, decreasing the sump volume must be balanced against maintaining an adequate sump volume to scavenge oil without flooding the various components in the sump. Thus, systems and methods of effectively removing oil from the sump are of high importance.

The present disclosure is directed to systems and methods of reducing the scavenge requirements of a bearing sump by reducing the volume of oil to be collected in the sump. The present disclosure improves upon prior art systems and methods by avoiding the discharge of pressurized oil from the squeeze film damper to the sump, thus reducing the volume of oil to be scavenged from the sump and collected via the collection orifice. This aids in oil management and scavenge capability inside the sump. This advantage is doubled in a sump with two bearings and two squeeze film dampers. In some embodiments, pressurized oil may be directly discharged from a squeeze film damper to a scavenge line. In other embodiments, pressurized oil may be discharged from the squeeze film damper in a manner to avoid contact with the radially inner surface of the sump prior to collection at the collection orifice.

Figure 2:
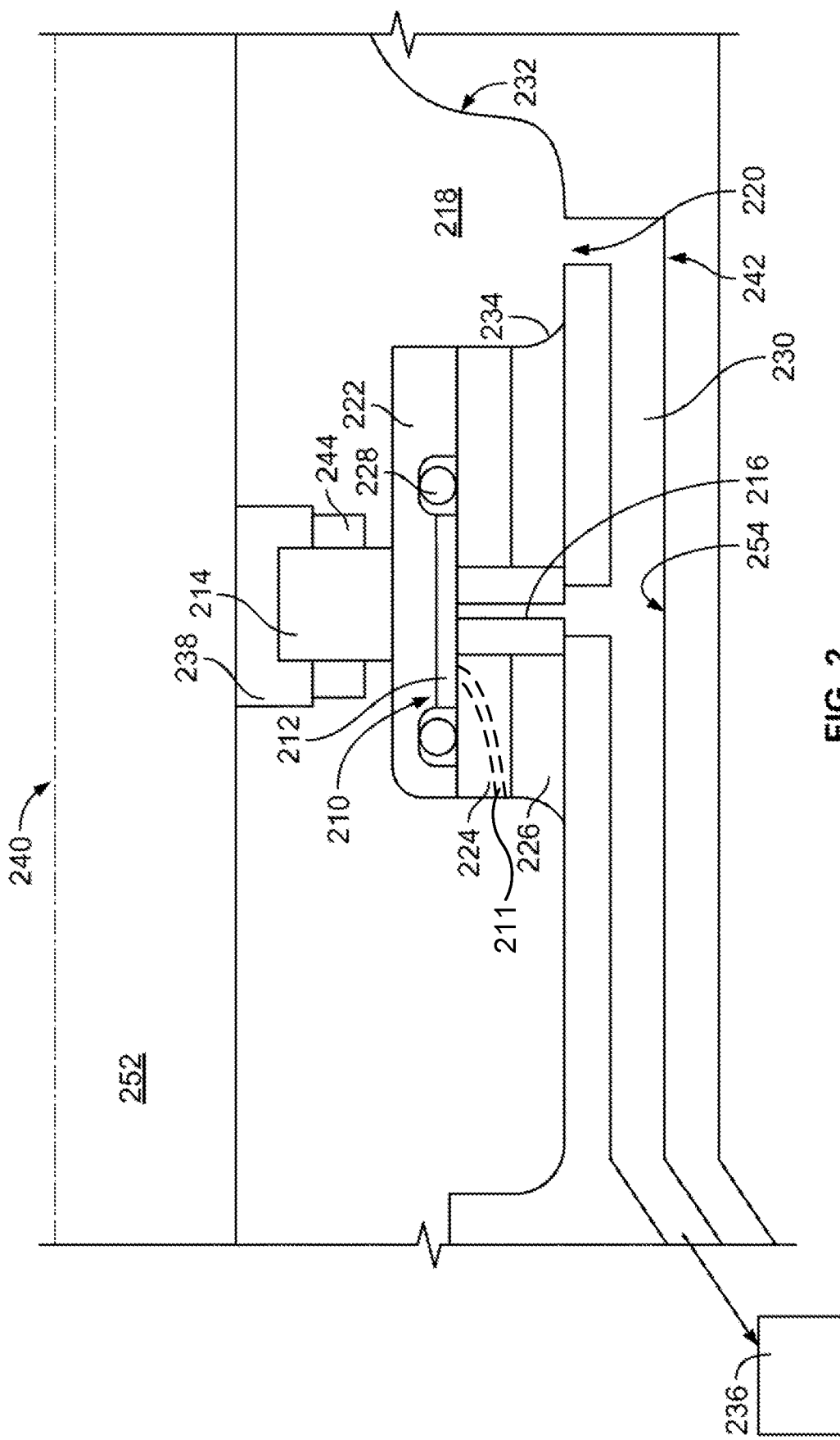
FIG. 2 is a cross-sectional view of a bearing region taken along the axis of rotation of the region, in accordance with some embodiments of the present disclosure.

In some embodiments of the present disclosure, the volume of oil required to be collected and managed by a bearing sump is reduced by directly discharging oil from the squeeze film damper to a scavenge conduit external to the sump. In some embodiments of the present disclosure, the volume of oil required to be collected and managed by a bearing sump is reduced by axially aligning a discharge line of the squeeze film damper with an inner wall of a scavenge conduit and discharging oil from the discharge line toward the inner wall. In some embodiments of the present disclosure, the volume of oil required to be collected and managed by a bearing sump is reduced by discharging oil from a discharge line of the squeeze film damper, which may be in fluid connection with the annular channel of the squeeze film damper, directly into a scavenge conduit without the oil contacting the radially inner surface of the sump. FIG. 2 is a cross-sectional view of a bearing region taken along the axis of rotation 240 of the shaft 252. Squeeze film damper 210 may comprise annular channel 212 proximate bearing 214. The squeeze film damper 210 is positioned radially outward from the bearing 214 and is filled with pressurized oil. The squeeze film damper 210 dampens movement of the bearing and addresses concerns about rotor dynamics, such as excess vibrations. The bearing 214 may be disposed within the sump 218 and positioned between outer race 222 and inner race 238, which may be coupled to a shaft 252 that rotates about axis of rotation 240. The bearing 214 may be axially constrained by a bearing cage 244.

The annular channel 212 may be radially defined between the outer race 222 and one or more bearing mount rings 224. The bearing mount rings 224 may interface with bearing pedestals 226, spaced around the circumference of the sump 218. The bearing mount rings 224 may be pinned and brazed in place atop the bearing pedestals 226. The annular channel 212 may be axially defined by seals 228 on either axial end, which prevent pressurized oil from leaking from the annular channel 212. The seals 228 may be positioned in a groove defined by the outer race 222 or the bearing mount ring 224.

The squeeze film damper 210 may further comprise a supply line 211 that supplies pressurized oil to the annular channel 212, which is filled with the oil. Pressurized oil may be supplied to the annular channel 212 via one or more supply lines 211. The supply lines 211 may be in fluid communication with a lubrication and scavenge system or other source of pressurized oil.

The squeeze film damper 210 may further comprise a discharge line 216. The discharge line 216 may be referred to as a damper exit passage. The discharge line 216 allows the pressurized oil within annular channel 212 to discharge directly to the scavenge conduit 230. The discharge line 216 places the annular channel 212 in fluid communication with the scavenge conduit 230. The discharge line 216 may be axially aligned with and may discharge toward the inner wall 254 of the scavenge conduit 230. The discharge line 216 is coupled to the scavenge conduit 230 downstream of the collection orifice 220. The scavenge conduit 230 may be in fluid communication with the collection orifice 220 and a downstream location remote from the sump.

In some embodiments the squeeze film damper 210 includes a single discharge line 216. The single discharge line 216 may be circumferentially offset from the supply line 211. In other embodiments, more than one discharge line 216 may be provided. The count and dimensions of the discharge lines 216 may be designed to ensure adequate oil flow through the annular channel 212 to provide dampening and heat removal. In embodiments having more than one discharge line 216, the discharge lines 216 may be spaced about the circumference of the annular channel 212. Each of the discharge lines 216 may be circumferentially aligned or circumferentially offset from one or more supply lines 211 to the annular channel 212.

Discharge line 216 may be a flowpath provided through the bearing mount ring 224 and bearing pedestal 226. The flowpath may be defined by the bearing mount ring 224 and bearing pedestal 226. The flowpath may be defined by additional piping, tubing, or similar structures provided through the bearing mount ring 224 and bearing pedestal 226.

The discharge line 216 may be axially centered within the bearing pedestal 226 and bearing mount ring 224. The discharge line 216 may be axially offset from the center of the bearing pedestal 226 and bearing mount ring 224 and proximate either an axially forward or axially aft end of bearing pedestal 226 and bearing mount ring 224.

Sump 218 may be defined at least partly by a sump housing 232. The sump housing 232 may define a collection orifice 220. In some embodiments, the collection orifice 220 may be disposed at a radially outermost point of the sump housing 232. The sump housing 232 may have a radially inner surface 234, which forms a flowpath boundary for the scavenging of oil in the sump. Radially inner surface 234 may direct the flow of oil towards the collection orifice 220.

The collection orifice 220 may fluidly connect the sump 218 to the scavenge conduit 230. The area of the scavenge conduit 230 proximate the collection orifice 220 may be referred to as the sump exit passage 242. Similarly, the discharge line 216 may fluidly connect the squeeze film damper 210 to the scavenge conduit 230. The scavenge conduit 230 may discharge to a lubrication and scavenge system, which may include a scavenge pump 236.

In operation, oil is supplied at a pressure to the annular channel 212 via the supply line 211. The pressurized oil may dampen the movement of the bearing 214 and may eventually exit the annular channel 212 through discharge line 216. The oil may be discharged from discharge line 216 directly into scavenge conduit 230. The discharge line 216 may discharge oil directly into the scavenge conduit 230 without the oil contacting the radially inner surface 213. Oil may also be supplied to the bearing 214, which requires an oil supply for lubrication and to remove the heat generated during operation of the rotatable machine. Oil from the bearing 214 may drain into the sump 218 towards a collection orifice 220, where the oil may collect before entering the scavenge conduit 230. Scavenge conduit 230 may direct the oil from the bearing 214 and the squeeze film damper 210 to a scavenge pump 236, which may recirculate the oil into the system.

Oil may drain from the bearing 214 and may be discharged from the squeeze film damper 210 in order to remove heat from the system. Discharging oil directly from the squeeze film damper 210 to the scavenge conduit 230 allows for a smaller sump 218 because the sump 218 is only required to collect the volume of oil from the bearing 214 to be drained at the collection orifice 220, as opposed to the volume of oil drained from the bearing 214 and discharged from squeeze film damper 210.

Figure 3:
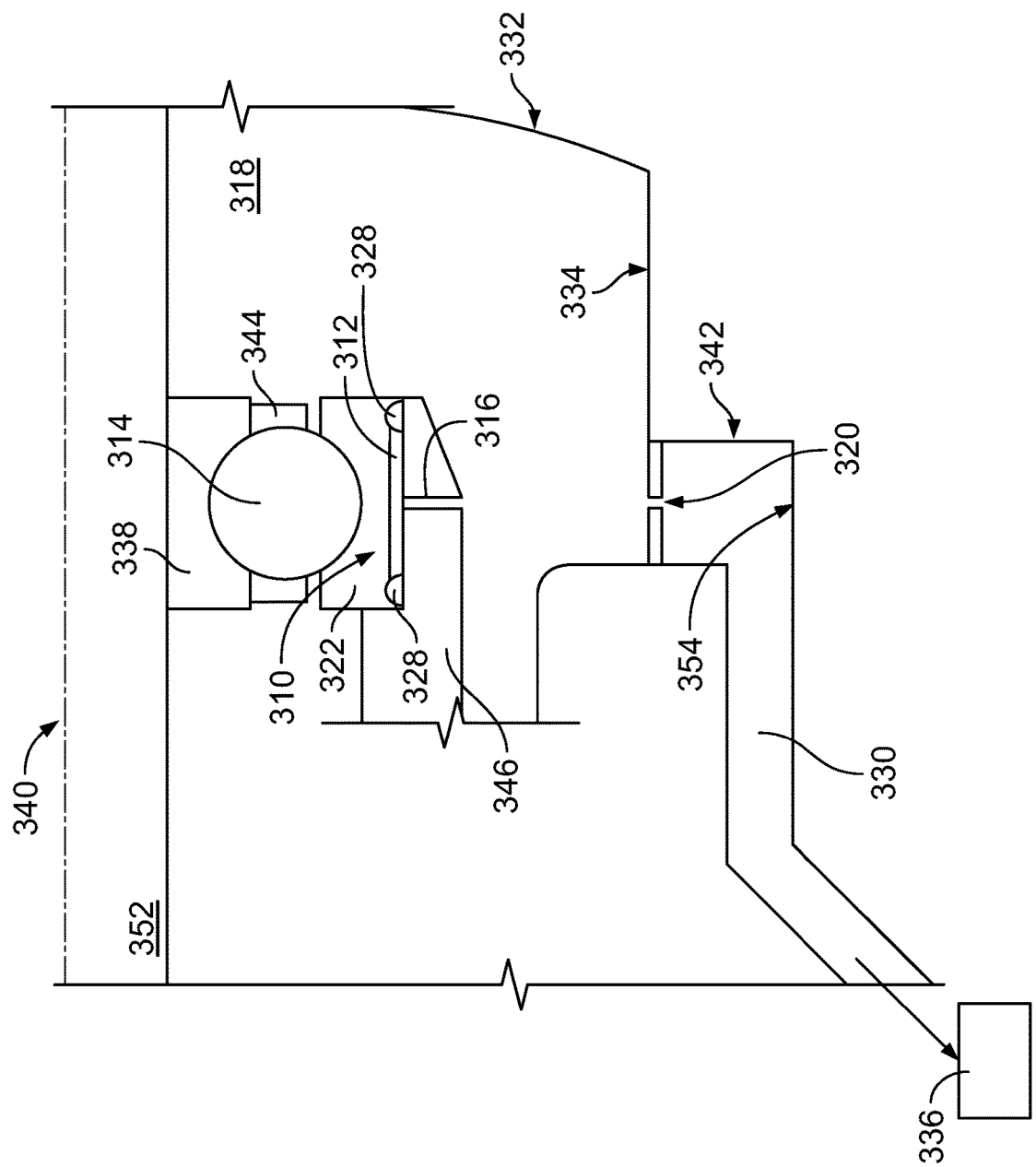
FIG. 3 is a cross-sectional view of a bearing region taken along the axis of rotation of the region, in accordance with some embodiments of the present disclosure.

In some embodiments of the present disclosure, the volume of oil required to be collected and managed by a bearing sump is reduced by discharging oil from the squeeze film damper in a manner to avoid contact with the radially inner surface of the sump prior to collection at the collection orifice. In some embodiments of the present disclosure, the volume of oil required to be collected and managed by a bearing sump is reduced by axially aligning a discharge line of the squeeze film damper with an inner wall of a scavenge conduit and discharging oil from the discharge line toward the inner wall. In some embodiments of the present disclosure, the volume of oil required to be collected and managed by a bearing sump is reduced by discharging oil from a discharge line of the squeeze film damper, which may be in fluid connection with the annular channel of the squeeze film damper, directly into a scavenge conduit without the oil contacting the radially inner surface of the sump. FIG. 3 is a cross-sectional view of a bearing region taken along the axis of rotation 340 of shaft 352. Squeeze film damper 310 may comprise annular channel 312 proximate bearing 314. The squeeze film damper 310 is positioned radially outward from the bearing 314 and is filled with pressurized oil. The squeeze film damper 310 dampens movement of the bearing and addresses concerns about rotor dynamics, such as excess vibrations. The bearing 314 may be disposed within the sump 318 and positioned between outer race 322 and inner race 338, which may be coupled to a shaft 352 that rotates about axis of rotation 340. The bearing 314 may be axially constrained by a bearing cage 344.

The annular channel 312 may be radially defined between the outer race 322 and support arm 346. The support arm 346 is disposed within the sump 318 and supports the bearing 314 at a position radially inward from the collection orifice 320 and radially outward from the bearing 314. The annular channel 312 may be axially defined by seals 328 on either axial end, which prevent pressurized oil from leaking from the annular channel 312. The seals 328 may be positioned in a groove defined by outer race 322 or support arm 346.

The squeeze film damper 310 may further comprise a supply line (not shown in FIG. 3) that supplies pressurized oil to the annular channel 312, which is filled with the oil. Pressurized oil may be supplied to the annular channel 312 via one or more supply lines. The supply lines may be in fluid communication with a lubrication and scavenge system or other source of pressurized oil.

The squeeze film damper 310 may further comprise a discharge line 316. The discharge line 316 may be referred to as a damper drain. The discharge line 316 may pass through the support arm 346 and may be aimed to direct oil directly into the collection orifice 320. The discharge line 316 may terminate at a radial extremity of the support arm 346. The discharge line 316 may be sized and positioned to direct oil into the collection orifice 320. The discharge line 316 may be axially aligned with and may discharge toward the inner wall 354 of the scavenge conduit 330.

In some embodiments, the squeeze film damper 310 includes a single discharge line 316. The single discharge line 316 may be circumferentially offset from the supply line. In other embodiments, more than one discharge line 316 may be provided. The count and dimensions of the discharge lines 316 may be designed to ensure adequate oil flow through the annular channel 312 to provide dampening and heat removal. In embodiments having more than one discharge line 316, the discharge lines 316 may be spaced about the circumference of the annular channel 312. Each of the discharge lines 316 may be circumferentially aligned or circumferentially offset from one or more supply lines to the annular channel 312.

Discharge line 316 may be a flowpath provided through the support arm 346. The flowpath may be defined by the support arm 346. The flowpath may be defined by additional piping, tubing, or similar structures provided through the support arm 346.

The discharge line 316 may be axially centered between seals 328. The discharge line may be axially offset from the center between seals 328 and proximate the axially forward seal 328 or proximate the axially aft seal 328.

The sump 318 may be defined in part by a sump housing 332. The sump housing 332 may define a collection orifice 320. In some embodiments, the collection orifice 320 may be disposed at a radially outermost point of the sump housing 332. The sump housing 332 may have a radially inner surface 334, which forms a flowpath boundary for the scavenging of oil in the sump. Radially inner surface 334 may direct the flow of oil towards the collection orifice 320. The collection orifice 320 may be axially aligned with the discharge line 316 and positioned radially outward therefrom. The collection orifice 320 may be circumferentially offset from the discharge line 316.

The collection orifice 320 may fluidly connect the sump 318 to the scavenge conduit 330 external to the sump 318. The area of the scavenge conduit 330 proximate the collection orifice 320 may be referred to as the sump exit passage 342. The scavenge conduit 330 may be in fluid communication with the collection orifice 320 and a downstream location remote from the sump. The scavenge conduit 330 may discharge to a lubrication and scavenge system, which may include a scavenge pump 336.

In operation, oil is supplied at a pressure to the annular channel 312 via the supply line (not shown in FIG. 3). This pressurized oil may dampen the movement of the bearing 314 and may eventually be discharged from the annular channel 312 through discharge line 316. The oil may be discharged from discharge line 316 at a sufficient pressure to direct the oil directly into collection orifice 320. The discharge line 316 may discharge oil directly into the scavenge conduit 330 without the oil contacting the radially inner surface 334. Oil may also be supplied to the bearing 314, which requires an oil supply for lubrication and to remove the heat generated during operation of the rotatable machine. Oil from the bearing 314 may drain into the sump 318 towards a collection orifice 320, where the oil may collect before entering the scavenge conduit 330. Scavenge conduit 330 may direct the oil from the bearing 314 and the squeeze film damper 310 to a scavenge pump 336, which may recirculate the oil into the system.

Oil may be drained from the bearing 314 and discharged from the squeeze film damper 310 in order to remove heat from the system. Discharging oil directly from the squeeze film damper 310 into collection orifice 320 allows for a smaller sump 318 because the sump 318 is only required to hold and collect the volume of oil drained from the bearing 314 before it reaches the collection orifice.

Figure 4:
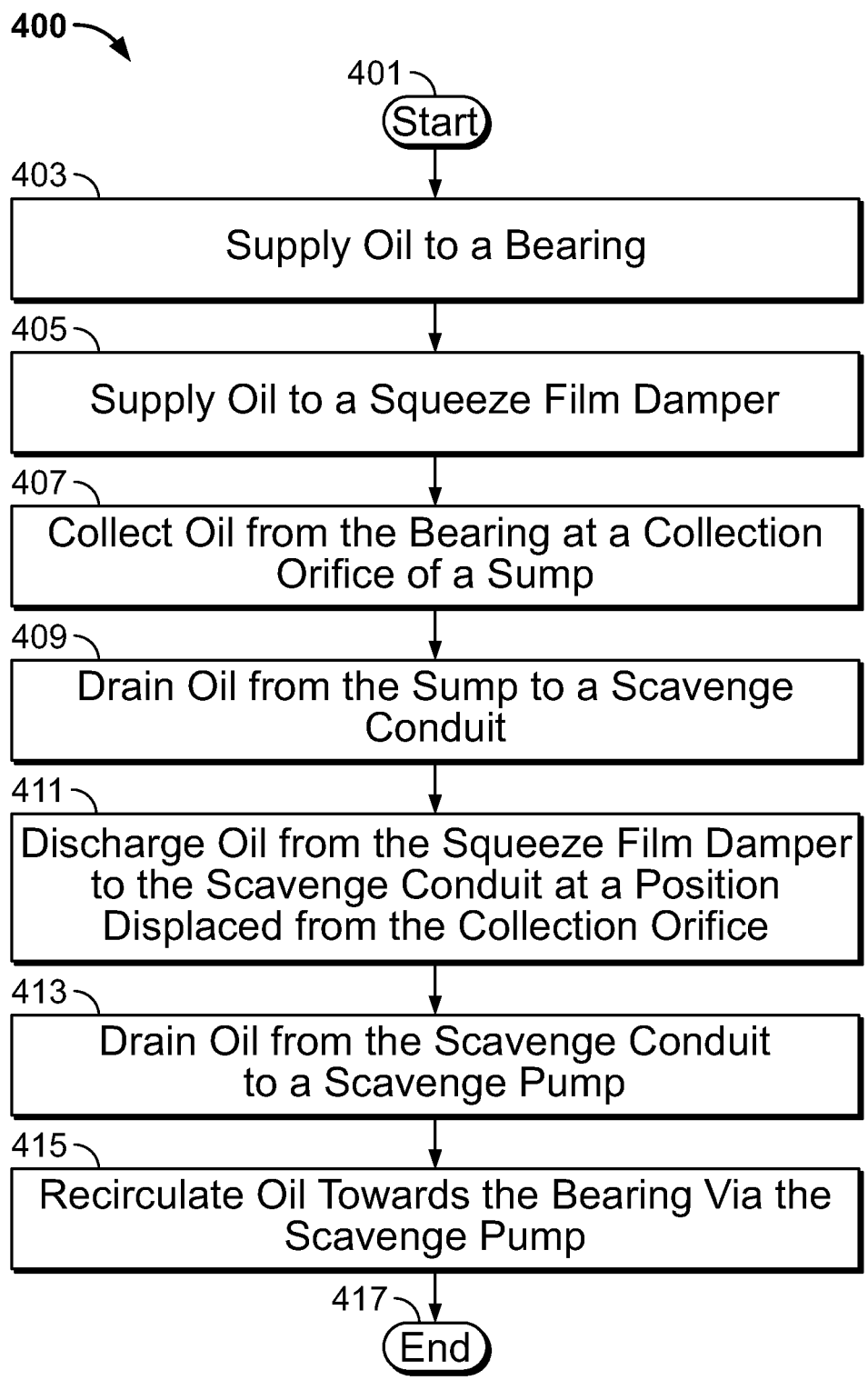
FIG. 4 is a flow diagram of a method in accordance with some embodiments of the present disclosure.

The present disclosure additionally includes methods of operating an oil scavenge system of a rotatable machine. FIG. 4 is a flow diagram of such a method.

Method 400 begins at Block 401.

At Block 403, oil is supplied to a bearing. The bearing may be disposed in a sump at least partly defined by a sump housing. The bearing may be positioned between a rotatable shaft and a bearing pedestal. The bearing may be radially abutted by an inner and outer race. The bearing may be axially constrained by a bearing cage. The bearing may be a roller bearing or ball bearing. The oil may be supplied to the bearing as a jet of oil sprayed from an oil nozzle or through under race lubrication.

At Block 405, oil is supplied to an annular channel of a squeeze film damper. The squeeze film damper may be positioned proximate the bearing. The squeeze film damper may comprise an annular channel and a supply line for supplying oil to the annular channel. The annular channel may be positioned axially between seals to prevent oil leakage.

At Block 407, oil is collected from the bearing at a collection orifice defined by the sump housing. The collection orifice may be positioned at a radial extremity of the sump housing. The sump may be a small annular space driven by windage from rotating shafts.

At Block 409, oil is drained from the sump to a scavenge conduit. The scavenge conduit may be coupled to the sump housing at the collection orifice in order to direct the flow of oil away from the sump. The scavenge conduit may comprise a cross-over section that is parallel to the axis of rotation. The scavenge conduit may further comprise a strut section at an angle relative to the axis of rotation. The collection orifice may be proximate a cross-over section of the scavenge conduit. The strut section may be downstream of the cross-over section.

At Block 411, oil is discharged from the annular channel of the squeeze film damper to the scavenge conduit at a position displaced from the collection orifice. A jumper tube may be used to discharge the oil from the annular channel to the scavenge conduit. The squeeze film damper may be proximate a cross-over section of the scavenge conduit.

At Block 413, oil is drained from the scavenge conduit to a scavenge pump. The scavenge pump may be proximate a strut section of the scavenge conduit. Oil may flow from the strut section into the scavenge pump.

At Block 415, oil is recirculated towards the bearing via the scavenge pump.

Method 400 ends at Block 417.

Method 400 enables oil from the squeeze film damper to be directly discharged into the scavenge conduit, which allows for the use of a smaller sump because the sump is only required to collect and drain the volume of oil drained from the bearing.

Figure 5:
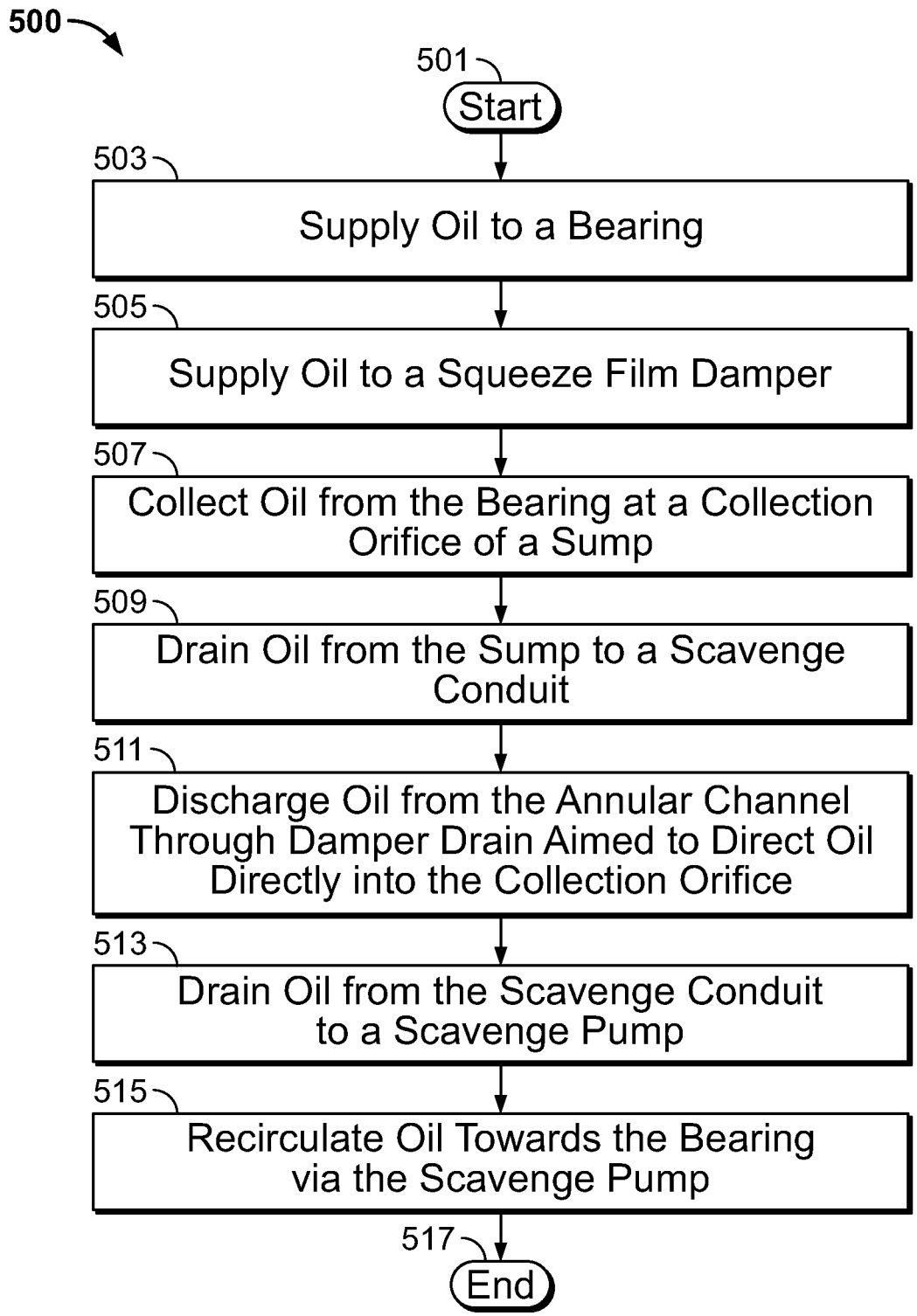
FIG. 5 is a flow diagram of a method in accordance with some embodiments of the present disclosure.

FIG. 5 is a flow diagram of another method of operating an oil scavenge system of a rotatable machine.

Method 500 begins at Block 501.

At Block 503, oil is supplied to a bearing. The bearing may be disposed in a sump at least partly defined by a sump housing arranged about the axis of rotation of a rotatable machine. The bearing may be positioned between a rotatable shaft and a support arm. The bearing may be radially abutted by an inner and outer race. The bearing may be axially constrained by a bearing cage. The bearing may be a roller bearing or ball bearing. The oil may be supplied to the bearing as a jet of oil sprayed from an oil nozzle or through under race lubrication.

At Block 505, oil is supplied to a squeeze film damper. The squeeze film damper may be positioned proximate the bearing and may comprise an annular channel and a supply line for supplying oil to the annular channel. The annular channel may be positioned axially between seals to prevent oil leakage.

At Block 507, oil is collected from the bearing at a collection orifice. The collection orifice may be defined by the sump housing. The collection orifice may be positioned at a radial extremity of the sump housing. The sump housing may be a small annular space driven by windage from rotating shafts.

At Block 509, oil is drained from the sump to a scavenge conduit. The scavenge conduit may be coupled to the sump housing at the collection orifice to direct the flow of oil away from the sump. The sump may be a small annular space driven by windage from rotating shafts.

At Block 511, oil is discharged from the annular channel through a damper drain aimed to direct oil directly into the collection orifice. The oil may be discharged through the damper drain at a sufficient pressure to direct the oil directly into the collection orifice.

At Block 513, oil is drained from the scavenge conduit to a scavenge pump.

At Block 515, oil is recirculated towards the bearing via the scavenge pump.

Method 500 ends at Block 517.

Method 500 enables oil discharged from a squeeze film damper to flow directly into a collection orifice, which allows for a smaller sump because the sump is only required to hold and collect the volume of oil drained from the bearing before it reaches the collection orifice.

Figure 6:
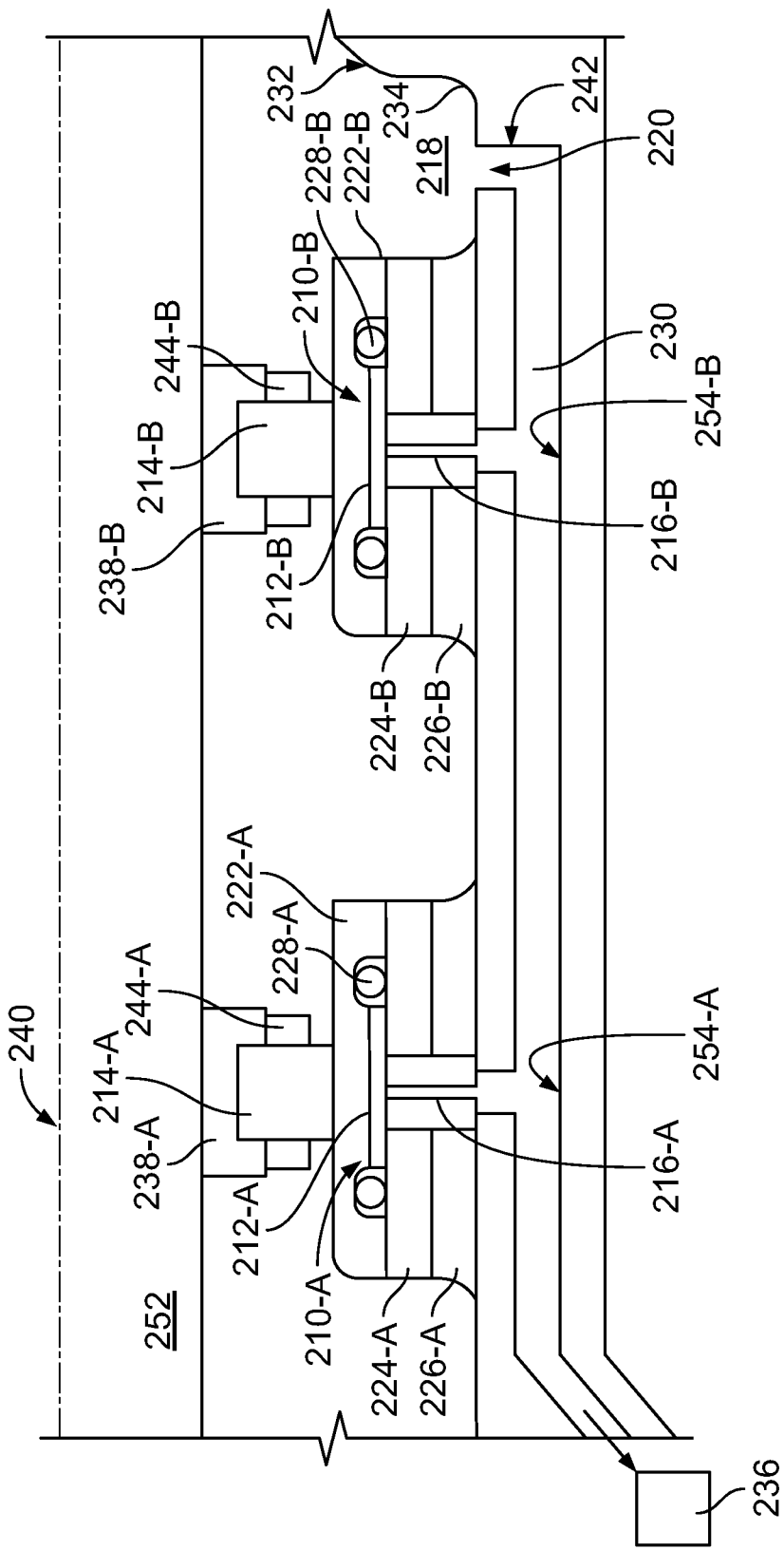
FIG. 6 is a cross-sectional view of two bearing regions taken along the axis of rotation of the region, in accordance with some embodiments of the present disclosure.

FIG. 6 is a cross-sectional view of two bearing regions taken along the axis of rotation of the regions. FIG. 6 is similar to FIG. 2 with the addition of a second bearing region, including an additional bearing and squeeze film damper. As such, FIG. 6 includes the same component numbering scheme at FIG. 2 with the addition of a "-A" denoting a component corresponding to the first bearing region and a "-B" denoting a component corresponding to the second bearing region. The advantages of the system in FIG. 2 are multiplied in the sump 218 of FIG. 6, as the system of FIG. 6 includes double the oil supply to manage considering it includes two bearings 214-A and 214-B and two squeeze film dampers 210-A and 210-B. However, the sump 218 is only required to drain the oil from the two bearings 214-A and 214-B and not the oil discharged from squeeze film dampers 210-A and 210-B, reducing the volume of oil to be collected in the sump 218.

Figure 7:
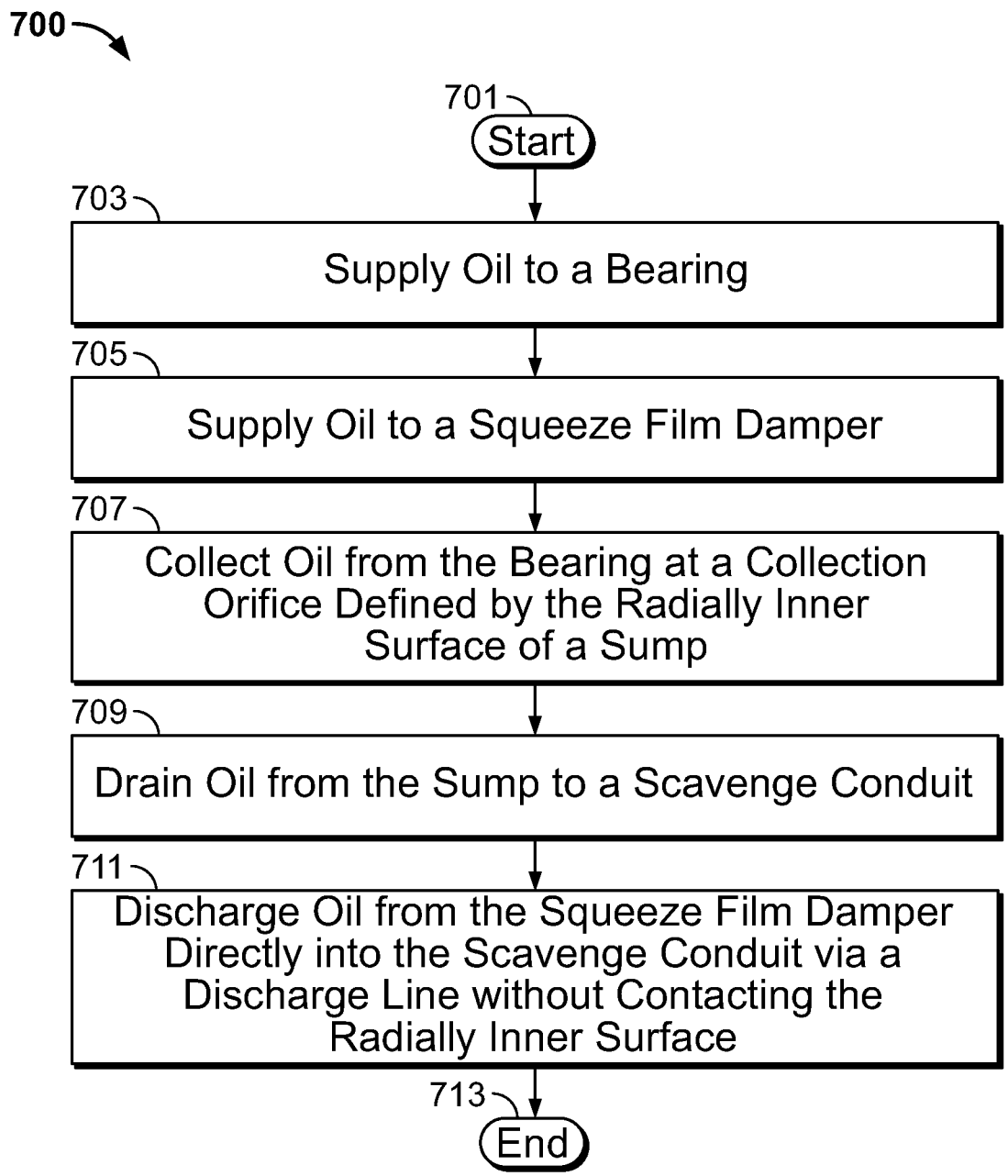
FIG. 7 is a flow diagram of a method in accordance with some embodiments of the present disclosure.

FIG. 7 is a flow diagram of another method of operating an oil scavenge system of a rotatable machine.

Method 700 begins at block 701.

At block 703, oil is supplied to a bearing. The bearing may be disposed within a sump that may be partly defined by a sump housing arranged about the axis of rotation of the rotatable machine. The sump housing may have a radially inner surface for directing the flow of oil.

At block 705, oil is supplied to a squeeze film damper. The squeeze film damper may be positioned proximate the bearing and may comprise an annular channel and a supply line for supplying oil to the annular channel.

At block 707, oil is collected from the bearing at a collection orifice defined by the radially inner surface of the sump.

At block 709, oil is drained from the sump to a scavenge conduit. The scavenge conduit may be coupled to the sump housing at the collection orifice to direct the flow of oil away from the sump.

At block 711, oil is discharged from the squeeze film damper directly into the scavenge conduit via a discharge line without contacting the radially inner surface. The oil may be discharged via a discharge line fluidly coupled to the scavenge conduit at a position downstream from the collection orifice. The oil may be discharged from the annular channel at a sufficient pressure to direct the oil directly into the collection orifice.

Method 700 ends at block 713.

Although examples are illustrated and described herein, embodiments are nevertheless not limited to the details shown, since various modifications and structural changes may be made therein by those of ordinary skill within the scope and range of equivalents of the claims.

What is claimed is:

1. An oil scavenge system of a rotatable machine having an axis of rotation, the system comprising:
    a sump housing arranged about the axis and at least partly defining a sump, the sump housing having a radially inner surface for directing the flow of oil and defining a collection orifice;
    a scavenge conduit in fluid communication with the collection orifice and a downstream location remote from the sump;
    a bearing disposed within the sump;
    a squeeze film damper positioned proximate the bearing and comprising:
      an annular channel; and
      a supply line for supplying oil to the annular channel;
    wherein the squeeze film damper further comprises a discharge line and said discharge line is axially aligned with and discharges toward an inner wall of the scavenge conduit,
    wherein the discharge line is fluidly coupled to the scavenge conduit at a position downstream from the collection orifice, and
    wherein the discharge line is coupled to the scavenge conduit between the collection orifice and a scavenge pump.

2. The oil scavenge system of claim 1 wherein the discharge line passes through one or more bearing mount rings.

3. The oil scavenge system of claim 1 wherein the discharge line passes through one or more bearing pedestals.

4. The oil scavenge system of claim 1 wherein the discharge line is aimed to direct oil directly into the collection orifice.

5. The oil scavenge system of claim 4 wherein the collection orifice is positioned radially outward from and axially aligned with the discharge line.

6. The oil scavenge system of claim 4 wherein the collection orifice is circumferentially offset from the discharge line.

7. The oil scavenge system of claim 1 further comprising a support arm radially outward from and supporting said bearing.

8. The oil scavenge system of claim 7 wherein the discharge line passes through the support arm, and wherein said discharge line is sized and positioned to direct oil into the collection orifice.

9. The oil scavenge system of claim 8 wherein the support arm is radially spaced from the collection orifice.

10. The oil scavenge system of claim 1 wherein the collection orifice is positioned at a radial extremity of the radially inner surface of the sump housing.

11. The oil scavenge system of claim 1 further comprising one or more seals axially defining the annular channel.

12. An oil scavenge system of a rotatable machine having an axis of rotation, the system comprising:
- a sump housing arranged about the axis and at least partly defining a sump, the sump housing having a radially inner surface for directing the flow of oil and defining a collection orifice;
- a scavenge conduit in fluid communication with the collection orifice and a downstream location remote from the sump;
- a bearing disposed within the sump;
- a squeeze film damper positioned proximate the bearing and comprising:
    - an annular channel; and
    - a supply line for supplying oil to the annular channel;
- wherein the squeeze film damper further comprises a discharge line in fluid connection with the annular channel, wherein said discharge line discharges oil directly into the scavenge conduit without the oil contacting the radially inner surface, and
- wherein the discharge line is fluidly coupled to the scavenge conduit at a position downstream from the collection orifice.

13. The oil scavenge system of claim 12 wherein the discharge line is aimed to direct oil directly into the collection orifice.

14. A method of operating an oil scavenge system of a rotatable machine having an axis of rotation, the method comprising:
- supplying oil to a bearing disposed within a sump at least partly defined by a sump housing arranged about the axis of rotation, the sump housing having a radially inner surface for directing the flow of oil;
- supplying oil to a squeeze film damper positioned proximate the bearing and comprising an annular channel and a supply line for supplying oil to the annular channel;
- collecting oil from the bearing at a collection orifice defined by the radially inner surface;
- draining oil from the sump to a scavenge conduit coupled to the sump housing at the collection orifice to direct the flow of oil away from the sump; and
- discharging oil from the annular channel of the squeeze film damper directly into the scavenge conduit via a discharge line without contacting the radially inner surface, wherein the discharge line is fluidly coupled to the scavenge conduit at a position downstream from the collection orifice.

15. The method of claim 14 further comprising discharging oil from the annular channel directly into the collection orifice.

* * * * *